(12) United States Patent
Vaal et al.

(10) Patent No.: US 9,175,547 B2
(45) Date of Patent: Nov. 3, 2015

(54) SYSTEM AND METHOD FOR PERFORMING OILFIELD PRODUCTION OPERATIONS

(75) Inventors: Randy J. Vaal, Stafford, TX (US); Fernando Gutierrez, Houston, TX (US); Daniel Colin Nesbitt Lucas-Clements, Nr Faringdon (GB); Michael Stundner, Baden (AT); Andrew John Howell, Calgary (CA)

(73) Assignee: Schlumberger Technology Corporation, Houston, TX (US)

( * ) Notice: Subject to any disclaimer, the term of this patent is extended or adjusted under 35 U.S.C. 154(b) by 1072 days.

(21) Appl. No.: 12/133,332

(22) Filed: Jun. 4, 2008

(65) Prior Publication Data

US 2008/0306803 A1 Dec. 11, 2008

Related U.S. Application Data

(60) Provisional application No. 60/933,181, filed on Jun. 5, 2007.

(51) Int. Cl.
*G06Q 10/00* (2012.01)
*E21B 41/00* (2006.01)
*E21B 43/00* (2006.01)
*G06Q 10/06* (2012.01)

(52) U.S. Cl.
CPC ............... *E21B 41/00* (2013.01); *E21B 43/00* (2013.01); *G06Q 10/06312* (2013.01); *G06Q 10/06316* (2013.01)

(58) Field of Classification Search
USPC ................. 705/7.11–7.42; 702/9–13
See application file for complete search history.

(56) References Cited

U.S. PATENT DOCUMENTS 4,794,534 A * 12/1988 Millheim ........................ 702/9
5,581,691 A * 12/1996 Hsu et al. ...................... 714/15
5,992,519 A * 11/1999 Ramakrishnan et al. 166/250.15

(Continued)

FOREIGN PATENT DOCUMENTS

| WO | 2004001661 A2 | 12/2003 |
| WO | 2007038405 A2 | 4/2007 |
| WO | 2007098087 A2 | 8/2007 |

OTHER PUBLICATIONS

Improved gas lift proposed for Hungarian field Gabor Takacs, Zoltan Turzo. Oil & Gas Journal. Tulsa: Jul. 7, 1997. vol. 95, Iss. 27; p. 57 (5 pages).*

(Continued)

*Primary Examiner* — Alan S Miller
(74) *Attorney, Agent, or Firm* — Alec J. McGinn

(57) ABSTRACT

The invention relates to a method of performing production operations of an oilfield having at least one process facility and at least one wellsite operatively connected thereto, each at least one wellsite having a wellbore penetrating a subterranean formation for extracting fluid from an underground reservoir therein. The method steps include receiving a number of steps each from at least one of a number of collaborators, specifying an automated workflow including the number of steps and for generating a first well plan, obtaining first data associated with the production operations, applying the automated workflow to the first data to generate the first well plan, adjusting the production operations based on the first well plan, and modifying at least one of the number of steps based on input from at least one of the number of collaborators to generate an updated automated workflow.

13 Claims, 10 Drawing Sheets

(56) References Cited

U.S. PATENT DOCUMENTS

| | | |
|---|---|---|
| 9,964,896 | 12/1999 | Randen |
| 6,266,619 B1* | 7/2001 | Thomas et al. ............... 702/13 |
| 6,313,837 B1 | 11/2001 | Assa et al. |
| 6,321,840 B1* | 11/2001 | Billiter et al. ............... 166/268 |
| 6,397,192 B1* | 5/2002 | Notani et al. ............... 705/7.26 |
| 6,434,435 B1* | 8/2002 | Tubel et al. ............... 700/30 |
| 6,519,568 B1 | 2/2003 | Harvey et al. |
| 6,665,568 B1* | 12/2003 | Hott ............... 700/95 |
| 6,728,947 B1* | 4/2004 | Bengston ............... 717/103 |
| 6,826,483 B1* | 11/2004 | Anderson et al. ............... 702/13 |
| 6,829,570 B1* | 12/2004 | Thambynayagam et al. .. 703/10 |
| 6,836,731 B1 | 12/2004 | Whalley et al. |
| 6,873,267 B1* | 3/2005 | Tubel et al. ............... 340/853.3 |
| 6,895,573 B2* | 5/2005 | Nørgaard et al. ............... 717/100 |
| 6,980,940 B1* | 12/2005 | Gurpinar et al. ............... 703/10 |
| 7,079,952 B2* | 7/2006 | Thomas et al. ............... 702/13 |
| 7,107,188 B2 | 9/2006 | Veneruso et al. |
| 7,248,259 B2 | 7/2007 | Fremming |
| 7,448,046 B2* | 11/2008 | Navani et al. ............... 719/316 |
| 7,512,544 B2* | 3/2009 | Carter et al. ............... 705/7.31 |
| 7,539,625 B2* | 5/2009 | Klumpen et al. ............... 705/7.22 |
| 7,548,873 B2* | 6/2009 | Veeningen et al. ............... 705/7.12 |
| 7,953,587 B2* | 5/2011 | Bratton et al. ............... 703/10 |
| 8,224,783 B1* | 7/2012 | Burleigh et al. ............... 707/654 |
| 8,521,570 B2* | 8/2013 | Sadiq ............... 705/7.11 |
| 2002/0052769 A1* | 5/2002 | Navani et al. ............... 705/7 |
| 2002/0067373 A1* | 6/2002 | Roe et al. ............... 345/762 |
| 2003/0018512 A1* | 1/2003 | Dortmans ............... 705/9 |
| 2003/0132934 A1 | 7/2003 | Fremming |
| 2003/0216897 A1 | 11/2003 | Endres et al. |
| 2004/0078373 A1* | 4/2004 | Ghoneimy et al. ............... 707/10 |
| 2004/0104027 A1* | 6/2004 | Rossi et al. ............... 166/250.15 |
| 2004/0220846 A1 | 11/2004 | Cullick et al. |
| 2005/0119911 A1* | 6/2005 | Ayan et al. ............... 705/1 |
| 2005/0149307 A1* | 7/2005 | Gurpinar et al. ............... 703/10 |
| 2005/0209836 A1* | 9/2005 | Klumpen et al. ............... 703/10 |
| 2005/0209866 A1* | 9/2005 | Veeningen et al. ............... 705/1 |
| 2005/0209912 A1* | 9/2005 | Veeningen et al. ............... 705/11 |
| 2005/0236184 A1* | 10/2005 | Veeningen et al. ............... 175/40 |
| 2006/0047489 A1* | 3/2006 | Scheidt et al. ............... 703/10 |
| 2006/0074732 A1* | 4/2006 | Shukla et al. ............... 705/8 |
| 2006/0195510 A1* | 8/2006 | McNally ............... 709/203 |
| 2006/0197759 A1 | 9/2006 | Fremming |
| 2006/0224638 A1* | 10/2006 | Wald et al. ............... 707/200 |
| 2007/0112547 A1 | 5/2007 | Ghorayeb et al. |
| 2007/0192072 A1* | 8/2007 | Cullick et al. ............... 703/10 |
| 2007/0198234 A1 | 8/2007 | Zangl et al. |
| 2007/0272407 A1* | 11/2007 | Lehman et al. ............... 166/250.1 |
| 2008/0126168 A1 | 5/2008 | Carney et al. |
| 2008/0133194 A1 | 6/2008 | Klumpen et al. |
| 2008/0235280 A1* | 9/2008 | Schoen et al. ............... 707/104.1 |
| 2008/0262802 A1* | 10/2008 | Halabe et al. ............... 703/1 |

OTHER PUBLICATIONS

Real-Time Infrastructure: Enabling the Digital Oifield Anonymous. Ocean News & Technology. Palm City: Sep./Oct. 2005. vol. 11, Iss. 5; p. 44, 3 pgs.*
Choi, Injun et al., Task net: Transactional workflow model based on colored Petri net European Journal of Operational Research, vol. 136, 2002.*
TrackWise Users Guide Sparta Systems, Inc. 2000.*
Attie, PC et al., Scheduling workflows by enforcing intertask dependencies Distributed System Engineering, vol. 3, 1996.*
Sriramdas, Srinivas, Systems Analysis of Drilling Engineering and Management to Design a Relational Database University of SouthWestern Louisianna, Spring 1998.*
Primavera Project Planner Planning and Control Guide Version 3.0 Primavera Systems, 1999.*
Oliver, Rod, Complete planning for maintenance turnarouds will ensure success Oil & Gas Journal, vol. 100, No. 17, Apr. 29, 2002.*
Canadian Examination Report Dated Jun. 3, 2011, for CA Patent Application No. 2687734, Filed on Jun. 5, 2008.
GCC Examination Report Dated May 27, 2014, for GCC Patent Application No. GCC/P/2008/10966, Filed on Jun. 4, 2008.
International Search Report and Written Opinion Dated Dec. 18, 2008 for PCT/US2008/065964, Filed Jun. 5, 2008.

* cited by examiner

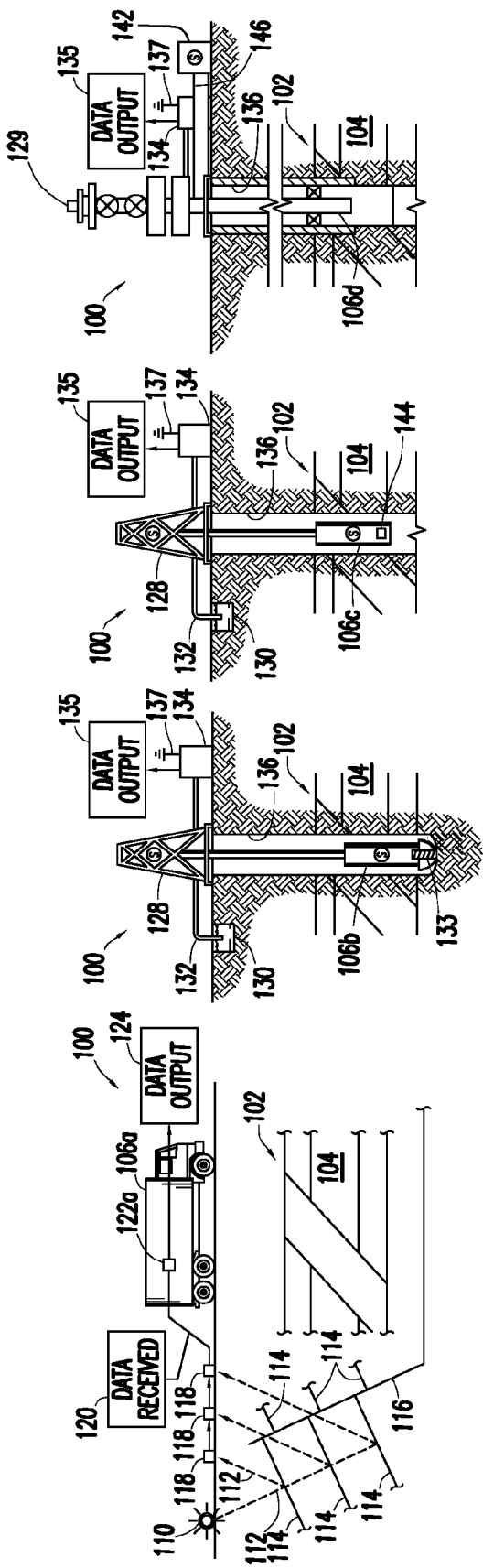
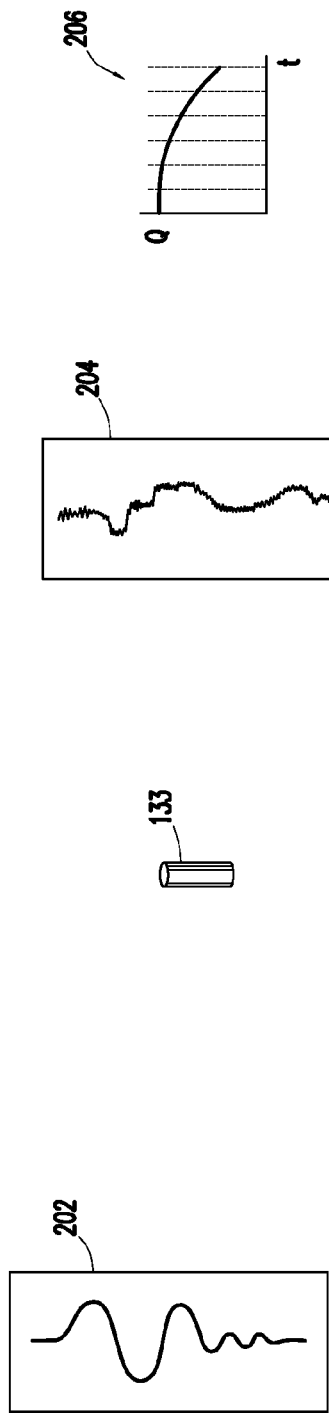

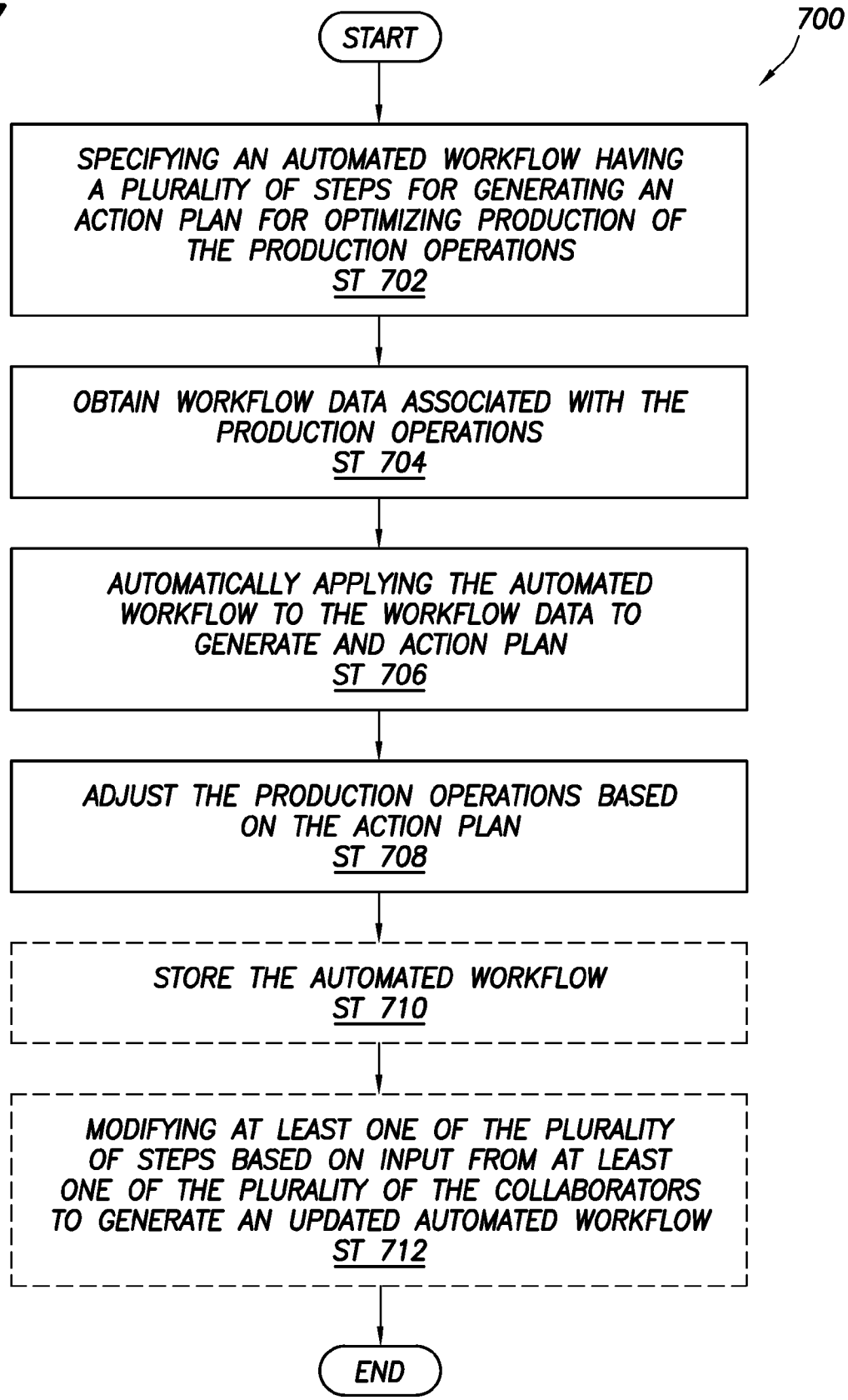

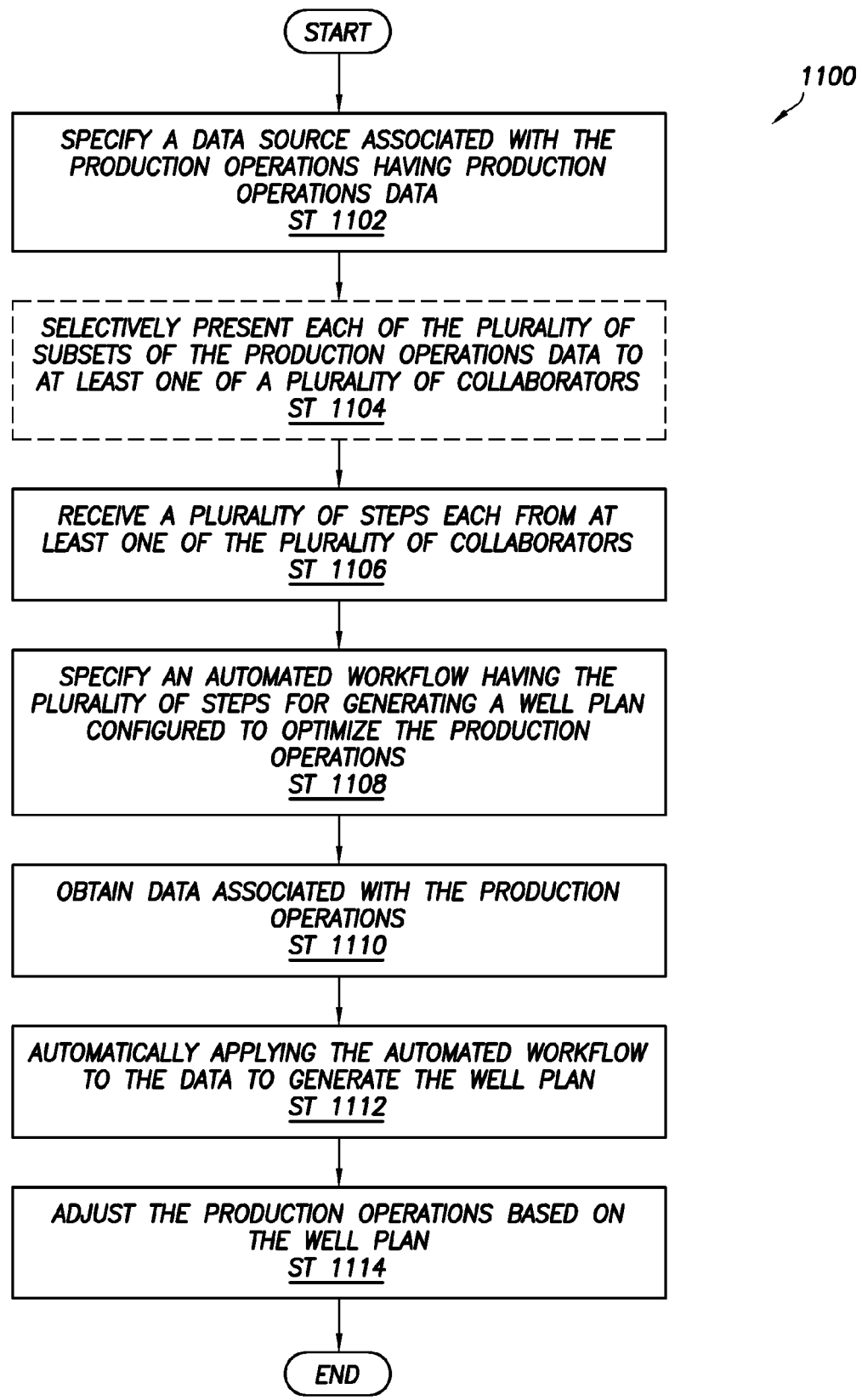

SYSTEM AND METHOD FOR PERFORMING OILFIELD PRODUCTION OPERATIONS

CROSS-REFERENCE TO RELATED APPLICATION

This application claims priority, pursuant to 35 U.S.C. §119(e), to U.S. Patent Application Ser. No. 60/933,181, entitled "System and Method for Performing Oilfield Production Operations," filed on Jun. 5, 2007, which is herein incorporated by reference in its entirety.

BACKGROUND OF THE INVENTION

1. Field of the Invention The present invention relates to techniques for performing oilfield operations relating to subterranean formations having reservoirs therein. More particularly, the invention relates to techniques for performing oilfield operations involving an analysis of production operations, and their impact on such operations.

2. Background of the Related Art

Oilfield operations, such as surveying, drilling, wireline testing, completions and production, are typically performed to locate and gather valuable downhole fluids. As shown in FIG. 1A, surveys are often performed using acquisition methodologies, such as seismic scanners to generate maps of underground structures. These structures are often analyzed to determine the presence of subterranean assets, such as valuable fluids or minerals. This information is used to assess the underground structures and locate the formations containing the desired subterranean assets. Data collected from the acquisition methodologies may be evaluated and analyzed to determine whether such valuable items are present, and if they are reasonably accessible.

As shown in FIGS. 1B-1D, one or more wellsites may be positioned along the underground structures to gather valuable fluids from the subterranean reservoirs. The wellsites are provided with tools capable of locating and removing hydrocarbons from the subterranean reservoirs. As shown in FIG. 1B, drilling tools are typically advanced from the oil rigs and into the earth along a given path to locate the valuable downhole fluids. During the drilling operation, the drilling tool may perform downhole measurements to investigate downhole conditions. In some cases, as shown in FIG. 1C, the drilling tool is removed and a wireline tool is deployed into the wellbore to perform additional downhole testing. Throughout this document, the term "wellbore" is used interchangeably with the term "borehole."

After the drilling operation is complete, the well may then be prepared for production. As shown in FIG. 1D, wellbore completions equipment is deployed into the wellbore to complete the well in preparation for the production of fluid therethrough. Fluid is then drawn from downhole reservoirs, into the wellbore and flows to the surface. Production facilities are positioned at surface locations to collect the hydrocarbons from the wellsite(s). Fluid drawn from the subterranean reservoir(s) passes to the production facilities via transport mechanisms, such as tubing. Various equipments may be positioned about the oilfield to monitor oilfield parameters and/or to manipulate the oilfield operations.

During the oilfield operations, data is typically collected for analysis and/or monitoring of the oilfield operations. Such data may include, for example, subterranean formation, equipment, historical and/or other data. Data concerning the subterranean formation is collected using a variety of sources. Such formation data may be static or dynamic. Static data relates to formation structure and geological stratigraphy that defines the geological structure of the subterranean formation. Dynamic data relates to fluids flowing through the geologic structures of the subterranean formation. Such static and/or dynamic data may be collected to learn more about the formations and the valuable assets contained therein.

Sources used to collect static data may be seismic tools, such as a seismic truck that sends compression waves into the earth as shown in FIG. 1A. These waves are measured to characterize changes in the density of the geological structure at different depths. This information may be used to generate basic structural maps of the subterranean formation. Other static measurements may be gathered using core sampling and well logging techniques. Core samples are used to take physical specimens of the formation at various depths as shown in FIG. 1B. Well logging involves deployment of a downhole tool into the wellbore to collect various downhole measurements, such as density, resistivity, etc., at various depths. Such well logging may be performed using, for example, the drilling tool of FIG. 1B and/or the wireline tool of FIG. 1C. Once the well is formed and completed, fluid flows to the surface using production tubing as shown in FIG. 1D. As fluid passes to the surface, various dynamic measurements, such as fluid flow rates, pressure and composition may be monitored. These parameters may be used to determine various characteristics of the subterranean formation.

Sensors may be positioned about the oilfield to collect data relating to various oilfield operations. For example, sensors in the wellbore may monitor fluid composition, sensors located along the flow path may monitor flow rates and sensors at the processing facility may monitor fluids collected. Other sensors may be provided to monitor downhole, surface, equipment or other conditions. The monitored data is often used to make decisions at various locations of the oilfield at various times. Data collected by these sensors may be further analyzed and processed. Data may be collected and used for current or future operations. When used for future operations at the same or other locations, such data may sometimes be referred to as historical data.

The processed data may be used to predict downhole conditions, and make decisions concerning oilfield operations. Such decisions may involve well planning, well targeting, well completions, operating levels, production rates and other configurations. Often this information is used to determine when to drill new wells, re-complete existing wells or alter wellbore production.

Data from one or more wellbores may be analyzed to plan or predict various outcomes at a given wellbore. In some cases, the data from neighboring wellbores, or wellbores with similar conditions or equipment is used to predict how a well will perform. There are usually a large number of variables and large quantities of data to consider in analyzing wellbore operations. It is, therefore, often useful to model the behavior of the oilfield operation to determine the desired course of action. During the ongoing operations, the operating conditions may need adjustment as conditions change and new information is received.

Techniques have been developed to model the behavior of geological structures, downhole reservoirs, wellbores, surface facilities as well as other portions of the oilfield operation. Examples of modeling techniques are shown in Patent/Application Nos. U.S. Pat. No. 5,992,519, WO2004/049216, WO1999/064896, U.S. Pat. No. 6,313,837, US2003/0216897, US2003/0132934, US2005/0149307, and US2006/0197759. Typically, existing modeling techniques have been used to analyze only specific portions of the oilfield operation. More recently, attempts have been made to use more than one model in analyzing certain oilfield operations. See, for example, US Patent/Application Nos. U.S. Pat. No. 6,980, 940, WO2004/049216, US2004/0220846, and U.S. Ser. No. 10/586,283.

Techniques have also been developed for performing production operations. See, for example, WO2004/001661 to Gurpinar and WO2004/049216 to Ghorayeb. Production techniques may involve an analysis of various aspects of the production operation, such as reservoir, wellbore, surface network, gathering network, process and/or other portions of the production operation. See, for example Patent/Publication/Application Nos. 60/855,262, 60/859,398, 60/925,425, PCT/US07/04248, US2005/0149307, U.S. Pat. No. 6,836, 731, U.S. Pat. No. 7,107,188, U.S. Pat. No. 6,980,940, US2004/0104027, WO2007/038405, and U.S. Pat. No. 6,519,568. Some production techniques involve various data analysis or manipulation functions as described, for example, in U.S. Pat. No. 6,519,568 or U.S. Patent Application No. 60/774,589.

Despite the development and advancement of production techniques in oilfield operations, there remains a need to provide techniques defining processes (or workflows) for performing production operations. It would be desirable to selectively define processes for performing the production operations so that the processes may be repeated as desired. It is further desirable that such processes may be selectively adjusted to optimize the production operations. External sources, such as collaborators, may be used to provide input and/or make adjustments to the production operations. Such desired production techniques are preferably capable of one of more of the following, among others: recording the processes for future use, defining/re-defining the processes based on input from external sources, defining processes with ad-hoc and/or external analysis, and retrieving processes based on conditions of the oilfield production operations, providing displays for visualizing the processes and performance (may be customized), providing comparisons of various processes and/or performances, selectively providing notices (i.e., alarms) based on given criteria, providing analysis capabilities (i.e., forecasting, history matching, balancing, etc), providing collaboration systems to allow input and/or adjustment by external sources, providing extensibility to external functions, providing customizable processes, providing an adaptable system that is tailored to the size/complexity of the oilfield operation, providing reports for publishing outputs of the production operation, and providing updates based on data inputs.

SUMMARY OF INVENTION

In general, in one aspect, the invention relates to a method of performing production operations of an oilfield having at least one process facility and at least one wellsite operatively connected thereto, each at least one wellsite having a wellbore penetrating a subterranean formation for extracting fluid from an underground reservoir therein. The method steps include receiving a number of steps each from at least one of a number of collaborators, specifying an automated workflow including the number of steps and for generating a first well plan, obtaining first data associated with the production operations, applying the automated workflow to the first data to generate the first well plan, adjusting the production operations based on the first well plan, and modifying at least one of the number of steps based on input from at least one of the number of collaborators to generate an updated automated workflow.

In general, in one aspect, the invention relates to a system for performing production operations of an oilfield having at least one process facilities and at least one wellsite operatively connected thereto, each at least one wellsite having a wellbore penetrating a subterranean formation for extracting fluid from an underground reservoir therein. The system includes a workflow manager, located within a field performance module, configured to receive a number of steps each from at least one of a number of collaborators and specify an automated workflow including the number of steps and for generating a first well plan. The system also includes the field performance module configured to obtain first data associated with the production operations and apply the automated workflow to the first data to generate the first well plan. The system also includes a surface unit configured to update the production operations based on the well plan.

In general, in one aspect, the invention relates to a computer readable medium, embodying instructions executable by the computer to perform method steps for performing production operations of an oilfield having at least one process facilities and at least one wellsite operatively connected thereto, each at least one wellsite having a wellbore penetrating a subterranean formation for extracting fluid from an underground reservoir therein. The instructions include functionality to receive a number of steps each from at least one of a number of collaborators, specify an automated workflow including the number of steps and for generating a first well plan, obtain first data associated with the production operations, and apply the automated workflow to the first data to generate the first well plan, where the production operations are adjusted based on the first well plan.

Other aspects and advantages of the invention will be apparent from the following description and the appended claims.

BRIEF DESCRIPTION OF DRAWINGS

FIGS. 1A-1D depict a schematic view of an oilfield having subterranean structures containing reservoirs therein, various oilfield operations being performed on the oilfield.

FIGS. 2A-2D are graphical depictions of data collected by the tools of FIGS. 1A-D, respectively.

FIG. 6A depicts a production system for performing production operations for an oilfield. FIG. 6B depicts an alternate view of the production system of FIG. 6A.

FIGS. 7-11 show exemplary flow charts depicting production methods for performing oilfield production operations.

DETAILED DESCRIPTION

Figure 3:
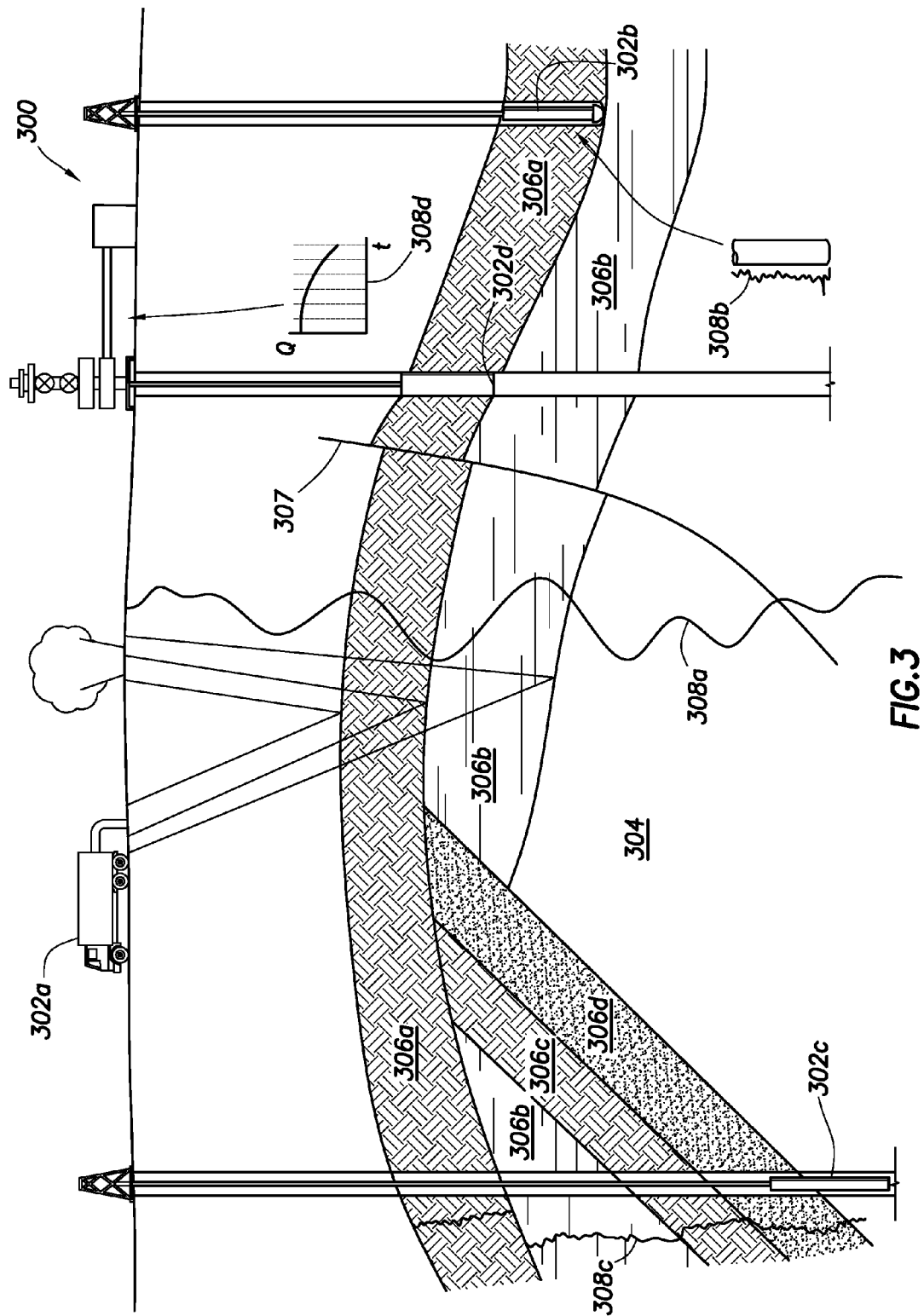
FIG. 3 shows an exemplary schematic view, partially in cross section, of an oilfield having a plurality of data acquisition tools positioned at various locations along the oilfield for collecting data from the subterranean formation.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention. The use of "ST" and "Step" as used herein and in the Figures are essentially the same for the purposes of this patent application.

The present invention involves applications generated for the oil and gas industry. FIGS. 1A-1D illustrate an exemplary oilfield (100) with subterranean structures and geological structures therein. More specifically, FIGS. 1A-1D depict schematic views of an oilfield (100) having subterranean structures (102) containing a reservoir (104) therein and depicting various oilfield operations being performed on the oilfield. Various measurements of the subterranean formation are taken by different tools at the same location. These measurements may be used to generate information about the formation and/or the geological structures and/or fluids contained therein.

FIG. 1A depicts a survey operation being performed by a seismic truck (106a) to measure properties of the subterranean formation. The survey operation is a seismic survey operation for producing sound vibrations. In FIG. 1A, an acoustic source (110) produces sound vibrations (112) that reflect off a plurality of horizons (114) in an earth formation (116). The sound vibration(s) (112) is (are) received in by sensors, such as geophone-receivers (118), situated on the earth's surface, and the geophones-receivers (118) produce electrical output signals, referred to as data received (120) in FIG. 1A.

The received sound vibration(s) (112) are representative of different parameters (such as amplitude and/or frequency). The data received (120) is provided as input data to a computer (122a) of the seismic truck (106a), and responsive to the input data, the recording truck computer (122a) generates a seismic data output record (124). The seismic data may be further processed, as desired, for example by data reduction.

FIG. 1B depicts a drilling operation being performed by a drilling tool (106b) suspended by a rig (128) and advanced into the subterranean formation (102) to form a wellbore (136). A mud pit (130) is used to draw drilling mud into the drilling tool via a flow line (132) for circulating drilling mud through the drilling tool and back to the surface. The drilling tool is advanced into the formation to reach the reservoir (104). The drilling tool is preferably adapted for measuring downhole properties. The logging while drilling tool may also be adapted for taking a core sample (133) as shown, or removed so that a core sample (133) may be taken using another tool.

A surface unit (134) is used to communicate with the drilling tool and offsite operations. The surface unit (134) is capable of communicating with the drilling tool (106b) to send commands to drive the drilling tool (106b), and to receive data therefrom. The surface unit (134) is preferably provided with computer facilities for receiving, storing, processing, and analyzing data from the oilfield. The surface unit (134) collects data output (135) generated during the drilling operation. Such data output (135) may be stored on a computer readable medium (compact disc (CD), tape drive, hard disk, flash memory, or other suitable storage medium). Further, data output (135) may be stored on a computer program product that is stored, copied, and/or distributed, as necessary. Computer facilities, such as those of the surface unit, may be positioned at various locations about the oilfield and/or at remote locations.

Sensors (S), such as gauges, may be positioned throughout the reservoir, rig, oilfield equipment (such as the downhole tool), or other portions of the oilfield for gathering information about various parameters, such as surface parameters, downhole parameters, and/or operating conditions. These sensors (S) preferably measure oilfield parameters, such as weight on bit, torque on bit, pressures, temperatures, flow rates, compositions, measured depth, azimuth, inclination and other parameters of the oilfield operation.

The information gathered by the sensors (S) may be collected by the surface unit (134) and/or other data collection sources for analysis or other processing. The data collected by the sensors (S) may be used alone or in combination with other data. The data may be collected in a database and all or select portions of the data may be selectively used for analyzing and/or predicting oilfield operations of the current and/or other wellbores.

Data outputs from the various sensors (S) positioned about the oilfield may be processed for use. The data may be may be historical data, real time data, or combinations thereof. The real time data may be used in real time, or stored for later use. The data may also be combined with historical data or other inputs for further analysis. The data may be housed in separate databases, or combined into a single database.

The collected data may be used to perform analysis, such as modeling operations. For example, the seismic data output may be used to perform geological, geophysical, and/or reservoir engineering simulations. The reservoir, wellbore, surface, and/or process data may be used to perform reservoir, wellbore, or other production simulations. The data outputs (135) from the oilfield operation may be generated directly from the sensors (S), or after some preprocessing or modeling. These data outputs (135) may act as inputs for further analysis.

The data is collected and stored at the surface unit (134). One or more surface units may be located at the oilfield, or linked remotely thereto. The surface unit (134) may be a single unit, or a complex network of units used to perform the necessary data management functions throughout the oilfield. The surface unit (134) may be a manual or automatic system. The surface unit (134) may be operated and/or adjusted by a user.

The surface unit (134) may be provided with a transceiver (137) to allow communications between the surface unit (134) and various portions of the oilfield and/or other locations. The surface unit (134) may also be provided with or functionally linked to a controller for actuating mechanisms at the oilfield. The surface unit (134) may then send command signals to the oilfield in response to data received. The surface unit (134) may receive commands via the transceiver (137) or may itself execute commands to the controller. A processor may be provided to analyze the data (locally or remotely) and make the decisions to actuate the controller. In this manner, the oilfield may be selectively adjusted based on the data collected. These adjustments may be made automatically based on computer protocol, or manually by an operator. In some cases, well plans and/or well placement may be adjusted to select optimum operating conditions, or to avoid problems.

FIG. 1C depicts a wireline operation being performed by a wireline tool (106c) suspended by the rig (128) and into the wellbore (136) of FIG. 1B. The wireline tool (106c) is preferably adapted for deployment into a wellbore (136) for performing well logs, performing downhole tests and/or collecting samples. The wireline tool (106c) may be used to provide another method and apparatus for performing a seismic survey operation. The wireline tool (106c) of FIG. 1C may have an explosive or acoustic energy source (144) that provides electrical signals to the surrounding subterranean formations (102).

The wireline tool (106c) may be operatively linked to, for example, the geophone-receivers (118) stored in the computer (122a) of the seismic recording truck (106a) of FIG. 1A. The wireline tool (106c) may also provide data to the surface unit (134). As shown data output (135) is generated by the wireline tool (106c) and collected at the surface. The wireline tool (106c) may be positioned at various depths in the wellbore (136) to provide a survey of the subterranean formation (102).

FIG. 1D depicts a production operation being performed by a production tool (106d) deployed from a production unit or christmas tree (129) and into the completed wellbore (136) of FIG. 1C for drawing fluid from the downhole reservoirs into the surface facilities (142). Fluid flows from reservoir (104) through perforations in the casing (not shown) and into the production tool (106d) in the wellbore (136) and to the surface facilities (142) via a gathering network (146).

Sensors (S), such as gauges, may be positioned about the oilfield to collect data relating to various oilfield operations as described previously. As shown, the sensor (S) may be positioned in the production tool (106d) or associated equipment, such as the Christmas tree, gathering network, surface facilities and/or the production facility, to measure fluid parameters, such as fluid composition, flow rates, pressures, temperatures, and/or other parameters of the production operation.

While only simplified wellsite configurations are shown, it will be appreciated that the oilfield may cover a portion of land, sea and/or water locations that hosts one or more wellsites. Production may also include injection wells (not shown) for added recovery. One or more gathering facilities may be operatively connected to one or more of the wellsites for selectively collecting downhole fluids from the wellsite(s).

During the production process, data output (135) may be collected from various sensors (S) and passed to the surface unit (134) and/or processing facilities. This data may be, for example, reservoir data, wellbore data, surface data, and/or process data.

Throughout the oilfield operations depicted in FIGS. 1A-D, there are numerous business considerations. For example, the equipment used in each of these Figures has various costs and/or risks associated therewith. At least some of the data collected at the oilfield relates to business considerations, such as value and risk. This business data may include, for example, production costs, rig time, storage fees, price of oil/gas, weather considerations, political stability, tax rates, equipment availability, geological environment, and other factors that affect the cost of performing the oilfield operations or potential liabilities relating thereto. Decisions may be made and strategic business plans developed to alleviate potential costs and risks. For example, an oilfield plan may be based on these business considerations. Such an oilfield plan may, for example, determine the location of the rig, as well as the depth, number of wells, duration of operation and other factors that will affect the costs and risks associated with the oilfield operation.

While FIGS. 1A-1D depicts monitoring tools used to measure properties of an oilfield, it will be appreciated that the tools may be used in connection with non-oilfield operations, such as mines, aquifers or other subterranean facilities. In addition, while certain data acquisition tools are depicted, it will be appreciated that various measurement tools capable of sensing properties, such as seismic two-way travel time, density, resistivity, production rate, etc., of the subterranean formation and/or its geological structures may be used. Various sensors (S) may be located at various positions along the subterranean formation and/or the monitoring tools to collect and/or monitor the desired data. Other sources of data may also be provided from offsite locations.

The oilfield configuration of FIGS. 1A-1D is not intended to limit the scope of the invention. Part, or all, of the oilfield may be on land and/or sea. In addition, while a single oilfield measured at a single location is depicted, the present invention may be utilized with any combination of one or more oilfields, one or more processing facilities, and one or more wellsites.

FIGS. 2A-D are graphical depictions of data collected by the tools of FIGS. 1A-D, respectively. FIG. 2A depicts a seismic trace (202) of the subterranean formation of FIG. 1A taken by survey tool (106a). The seismic trace measures the two-way response over a period of time. FIG. 2B depicts a core sample (133) taken by the logging tool (106b). The core test typically provides a graph of the density, resistivity, or other physical property of the core sample over the length of the core. FIG. 2C depicts a well log(204) of the subterranean formation of FIG. 1C taken by the wireline tool (106c). The wireline log typically provides a resistivity measurement of the formation at various depts. FIG. 2D depicts a production decline curve (206) of fluid flowing through the subterranean formation of FIG. 1D taken by the production tool (106d). The production decline curve typically provides the production rate (Q) as a function of time (t).

The respective graphs of FIGS. 2A-2C contain static measurements that describe the physical characteristics of the formation. These measurements may be compared to determine the accuracy of the measurements and/or for checking for errors. In this manner, the plots of each of the respective measurements may be aligned and scaled for comparison and verification of the properties.

FIG. 2D provides a dynamic measurement of the fluid properties through the wellbore. As the fluid flows through the wellbore, measurements are taken of fluid properties, such as flow rates, pressures, composition, etc. As described below, the static and dynamic measurements may be used to generate models of the subterranean formation to determine characteristics thereof.

The models may be used to create an earth model defining the subsurface conditions. This earth model predicts the structure and its behavior as oilfield operations occur. As new information is gathered, part or all of the earth model may need adjustment.

FIG. 3 is a schematic view, partially in cross section of an oilfield (300) having data acquisition tools (302a), (302b), (302c) and (302d) positioned at various locations along the oilfield for collecting data of a subterranean formation (304). The data acquisition tools (302a-302d) may be the same as data acquisition tools (106a-106d) of FIG. 1, respectively. As shown, the data acquisition tools (302a-302d) generate data plots or measurements (308a-308d), respectively. These data plots are depicted along the oilfield to demonstrate the data generated by the various operations.

Data plots (308a-308c) are examples of static data plots that may be generated by the data acquisition tools (302a-302d), respectively. Static data plot (308a) is a seismic two-way response time and may be the same as the seismic trace (202) of FIG. 2A. Static plot (308b) is core sample data measured from a core sample of the formation (304), similar to the core sample (133) of FIG. 2B. Static data plot (308c) is a logging trace, similar to the well log(204) of FIG. 2C. Production decline curve or graph (308d) is a dynamic data plot of the fluid flow rate over time, similar to the graph (206) of FIG. 2D. Other data may also be collected, such as historical data, user inputs, economic information, other measurement data and other parameters of interest.

The subterranean formation (304) has a plurality of geological structures (306a-306d). As shown, the formation has a sandstone layer (306a), a limestone layer (306b), a shale layer (306c) and a sand layer (306d). A fault line (307) extends through the sandstone (306a) and shale (306b) layers. The static data acquisition tools are preferably adapted to measure the formation and detect the characteristics of the geological structures of the formation.

While a specific subterranean formation (304) with specific geological structures are depicted, it will be appreciated that the oilfield may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in the oilfield, it will be appreciated that one or more types of measurement may be taken at one or more location across one or more oilfields or other locations for comparison and/or analysis.

The data collected from various sources, such as the data acquisition tools of FIG. 3, may then be processed and/or evaluated. Typically, seismic data displayed in the static data plot (308a) from the data acquisition tool (302a) is used by a geophysicist to determine characteristics of the subterranean formations and features. Core data shown in static plot (308b) and/or log data from the well log(308c) are typically used by a geologist to determine various characteristics of the subterranean formation. Production data from the graph (308d) is typically used by the reservoir engineer to determine fluid flow reservoir characteristics. The data analyzed by the geologist, geophysicist and the reservoir engineer may be analyzed using modeling techniques. Examples of modeling techniques are described in U.S. Pat. No. 5,992,519, WO2004049216, WO1999/064896, U.S. Pat. No. 6,313,837, US2003/0216897, U.S. Pat. No. 7,248,259, US20050149307 and US2006/0197759. Systems for performing such modeling techniques are described, for example, in issued U.S. Pat. No. 7,248,259, the entire contents of which is hereby incorporated by reference.

Figure 4:
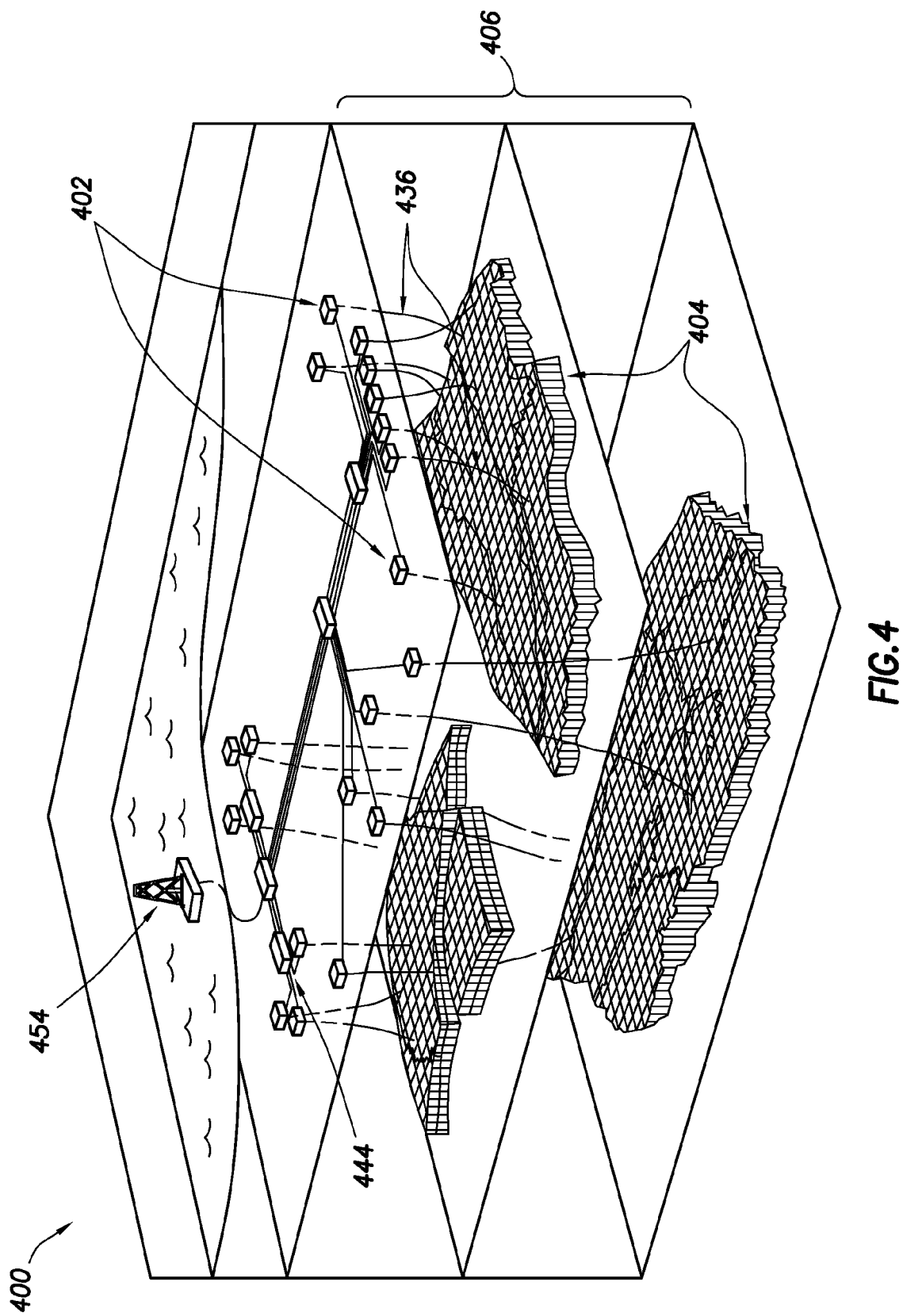
FIG. 4 shows an exemplary schematic view of an oilfield having a plurality of wellsites for producing oil from the subterranean formation.

FIG. 4 illustrates an oilfield (400) for performing production operations. As shown, the oilfield has a plurality of wellsites (402) operatively connected to a central processing facility (454). The oilfield configuration of FIG. 4 is not intended to limit the scope of the invention. Part or all of the oilfield may be on land and/or see. Also, while a single oilfield with a single processing facility and a plurality of wellsites is depicted, any combination of one or more oilfields, one or more processing facilities and one or more wellsites may be present.

Each wellsite (402) has equipment that forms a wellbore (436) into the earth. The wellbores extend through subterranean formations (406) including reservoirs (404). These reservoirs (404) contain fluids, such as hydrocarbons. The wellsites draw fluid from the reservoirs and pass them to the processing facilities via gathering networks (444). The gathering networks (444) have tubing and control mechanisms for controlling the flow of fluids from the wellsite to the processing facility (454).

Figure 5:
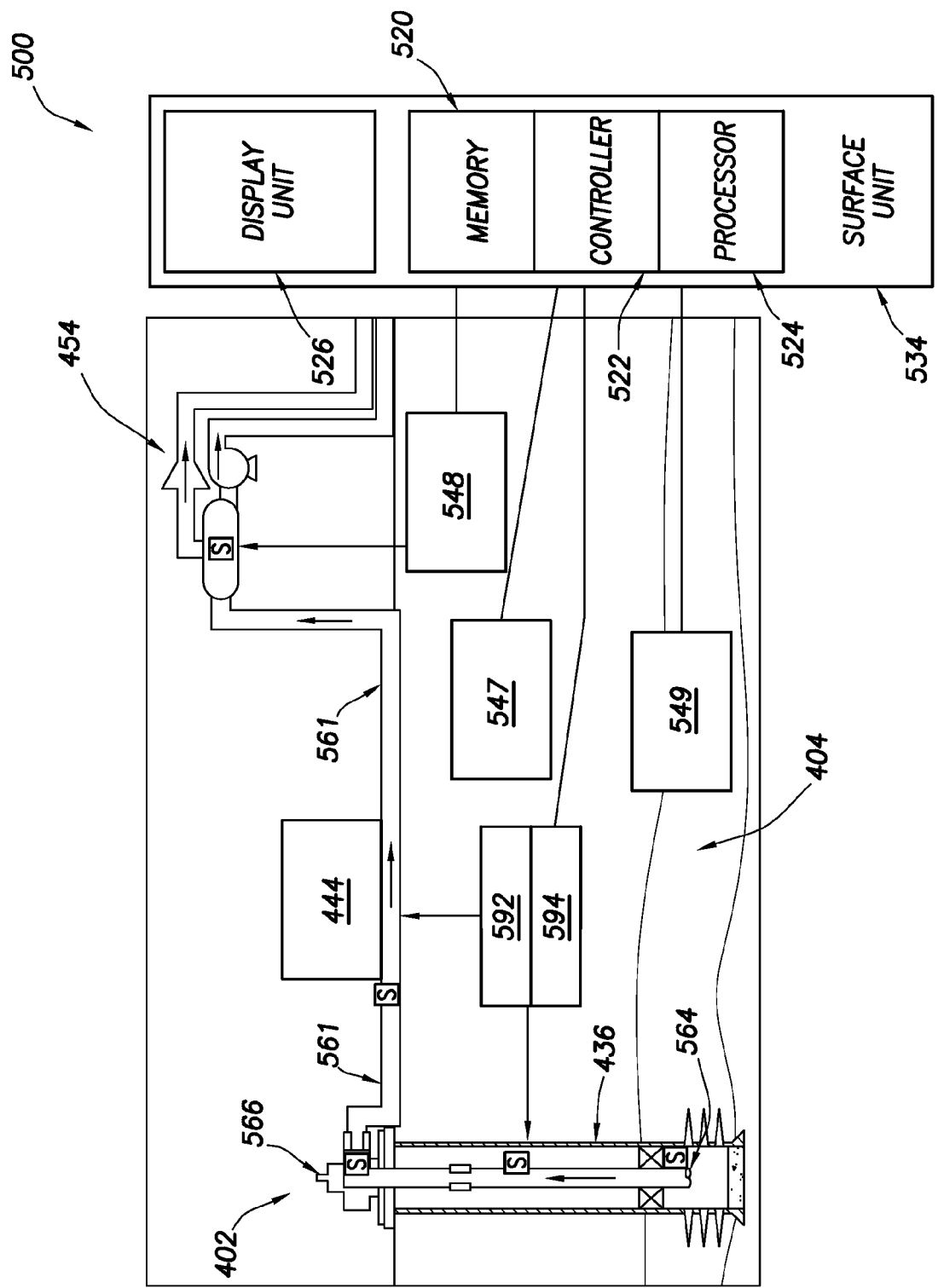
FIG. 5 shows an exemplary schematic diagram of a portion of the oilfield of FIG. 4 depicting the production operation in greater detail.

FIG. 5 shows a schematic view of a portion of the oilfield (400 of FIG. 4), depicting a wellsite (402) and gathering network (444) in detail. The wellsite (402) of FIG. 5 has a wellbore (436) extending into the earth therebelow. As shown, the wellbore (436) has already been drilled, completed, and prepared for production from reservoir (504).

Wellbore production equipment (564) extends from a wellhead (566) of wellsite (402) and to the reservoir (404) to draw fluid to the surface. The wellsite (402) is operatively connected to the gathering network (444) via a transport line (561). Fluid flows from the reservoir (404), through the wellbore (436), and onto the gathering network (444). The fluid then flows from the gathering network (444) to the process facilities (454).

As further shown in FIG. 5, sensors (S) are located about the oilfield (500) to monitor various parameters during oilfield operations. The sensors (S) may measure, for example, pressure, temperature, flow rate, composition, and other parameters of the reservoir, wellbore, gathering network, process facilities and/or other portions of the oilfield operation. These sensors (S) are operatively connected to a surface unit (534) for collecting data therefrom. The surface unit may be, for example, similar to the surface unit 134 of FIGS. 1A-D One or more surface units (e.g., surface unit (534)) may be located at the oilfield, or linked remotely thereto. The surface unit (534) may be a single unit, or a complex network of units used to perform the necessary data management functions throughout the oilfield. The surface unit (534) may be a manual or automatic system. The surface unit (534) may be operated and/or adjusted by a user. The surface unit (534) is adapted to receive and store data. The surface unit (534) may also be equipped to communicate with various oilfield equipment. The surface unit (534) may then send command signals to the oilfield in response to data received.

As shown in FIG. 5, the surface unit (534) has computer facilities, such as memory (520), controller (522), processor (524), and display unit (526), for managing the data. The data is collected in memory (520), and processed by the processor (524) for analysis. Data may be collected from the oilfield sensors (S) and/or by other sources. For example, oilfield data may be supplemented by historical data collected from other operations, or user inputs.

The analyzed data may then be used to make decisions. A transceiver (not shown) may be provided to allow communications between the surface unit (534) and the oilfield (500). The controller (522) may be used to actuate mechanisms at the oilfield (500) via the transceiver and based on these decisions. In this manner, the oilfield (500) may be selectively adjusted based on the data collected. These adjustments may be made automatically based on computer protocol and/or manually by an operator. In some cases, well plans are adjusted to select optimum operating conditions or to avoid problems.

A display unit (526) may be provided at the wellsite (402) and/or remote locations for viewing oilfield data (not shown). The oilfield data represented by a display unit (526) may be raw data, processed data and/or data outputs generated from various data. The display unit (526) is preferably adapted to provide flexible views of the data, so that the screens depicted may be customized as desired. A user may determine the desired course of action during production based on reviewing the displayed oilfield data. The production operation may be selectively adjusted in response to the display unit (526). The display unit (526) may include a two dimensional display for viewing oilfield data or defining oilfield events. For example, the two dimensional display may correspond to an output from a printer, plot, a monitor, or another device configured to render two dimensional output. The display unit (526) may also include a three-dimensional display for viewing various aspects of the production operation. At least some aspect of the production operation is preferably viewed in real time in the three-dimensional display. For example, the three dimensional display may correspond to an output from a printer, plot, a monitor, or another device configured to render three dimensional output.

To facilitate the processing and analysis of data, simulators may be used to process the data. Specific simulators are often used in connection with specific oilfield operations, such as reservoir or wellbore production. Data fed into the simulator(s) may be historical data, real time data or combinations thereof. Simulation through one or more of the simulators may be repeated or adjusted based on the data received.

As shown, the oilfield operation is provided with wellsite and non-wellsite simulators. The wellsite simulators may include a reservoir simulator (549), a wellbore simulator (592), and a surface network simulator (594). The reservoir simulator (549) solves for hydrocarbon flow through the reservoir rock and into the wellbores. The wellbore simulator (592) and surface network simulator (594) solves for hydrocarbon flow through the wellbore and the surface gathering network (444) of pipelines. As shown, some of the simulators may be separate or combined, depending on the available systems.

The non-wellsite simulators may include process and economics simulators. The processing unit has a process simulator (548). The process simulator (548) models the processing plant (e.g., the process facility (454)) where the hydrocarbon is separated into its constituent components (e.g., methane, ethane, propane, etc.) and prepared for sales. The oilfield (500) is provided with an economics simulator (547). The economics simulator (547) models the costs of part or all of the oilfield. Various combinations of these and other oilfield simulators may be provided.

Figure 6A:
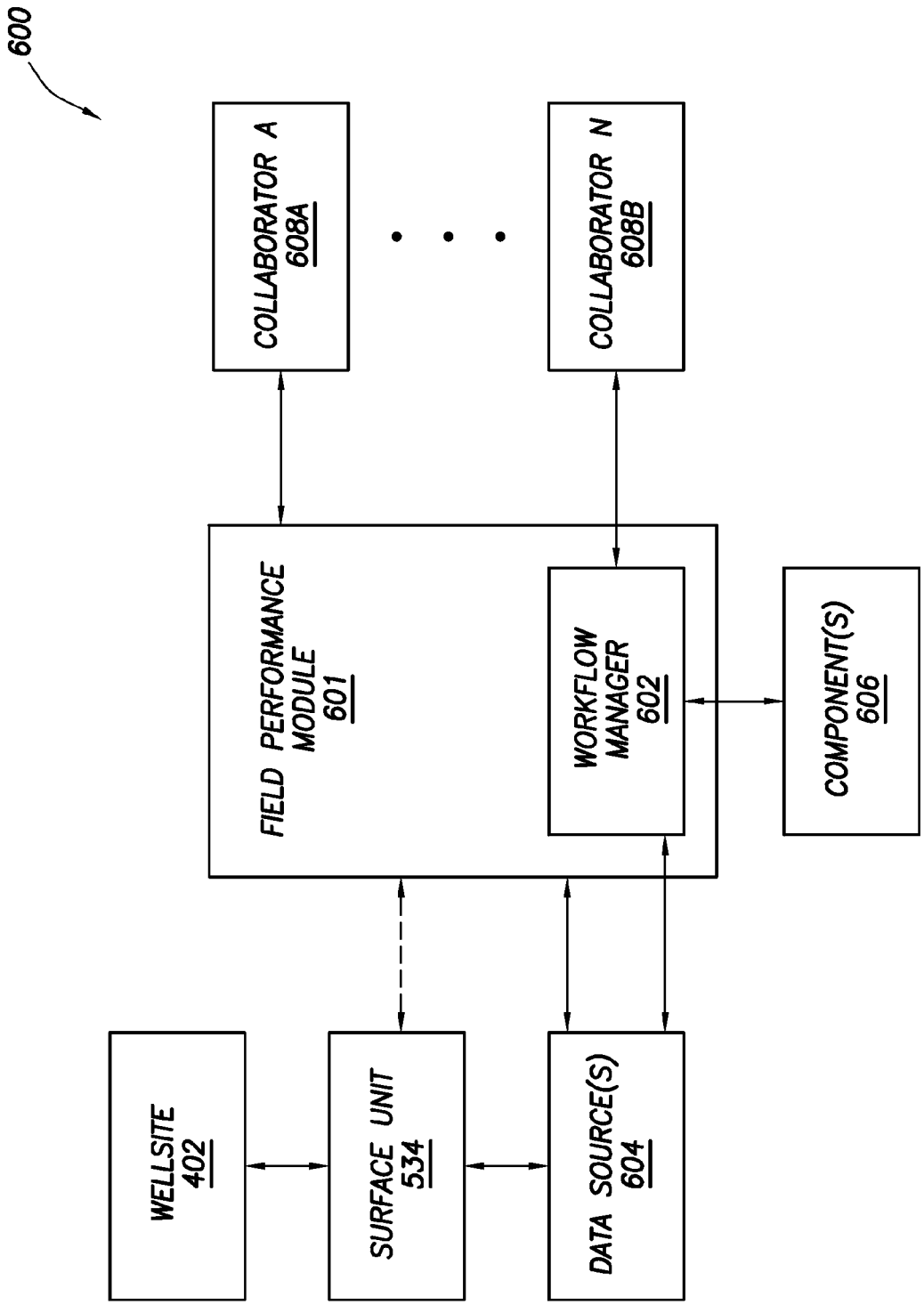
FIGS. 6A and 6B show exemplary schematic diagrams of production systems for performing oilfield production operations.

FIG. 6A is a schematic view of a production system (600) for performing a production operation of an oilfield. As shown, the system includes a field performance module (601) operatively connected to data source(s) (604). The field performance module (601) may further include a workflow manager (602). The workflow manager (602) may interact with the data source(s) (604). Optionally, the field performance module (601) may interact with a surface unit at the oilfield, such as surface unit (534) of FIG. 5. The surface unit (534) further interacts with a wellsite (402) (or more specifically with devices and/or systems at the wellsite (402) and/or process units). Optionally, the workflow manager (602) may interact with component(s) (606). Collaborators (608A, 608B) may interact with the field performance module (601), the workflow manager (602), and/or component(s) (606). The workflows used and/or generated by the workflow manager (602) may be manual and/or automatic workflows.

The surface unit (534) may collect and/or store data of the wellsite (402). This data may also be data received from other sources. The data may also be stored in memory (520 of FIG. 5) and/or on a computer readable medium such as a compact disk, DVD, optical media, volatile storage, non-volatile storage, or any other medium configured to store the data. Further, the data may be stored in data source(s) (604). Each data source (604) may store data in one or more formats. For example, a data source (604) may be a database, a flat-file, an extensible markup language (XML) file, or some other format.

The data source(s) (604) correspond to any system, device, or component configured to provide data. Examples of data sources (604) include, but are not limited to, a sensor (S) as described with respect to FIGS. 1A-D. Data sources (604) may also be associated with any aspect of the oilfield, such as the wellsite (402), the field performance module (601), the workflow manager (602); an external data source; a data source associated with multiple components; and/or some other data source. An external data source may be specified by a collaborator (608A) using the field performance module (601).

The collaborators (608A, 608B) may include any source that provides input into the production system (600). Such collaborators may be, for example, individuals, companies, or expert systems that have knowledge about oilfield production, which may be used to generate one or more steps in a workflow.

The field performance module (601) is configured to provide access to data associated with production operations. Specifically, the field performance module (601) may be configured to obtain data associated with a wellsite (402) and/or oilfield and then provide access to the data. At least some of the data may be collected as described, for example, in FIGS. 1-4. Further, the data may be historical data, real-time data, forecasted data or any combination thereof.

The field performance module (601) may also include functionality to transform (e.g., filter, normalize, time-shift, combine, perform operations on, and/or some other type of transformation) raw data (or other intermediate data) into data for use by the field performance module. The field performance module (601) may be further configured to analyze the data. As shown, the field performance module (601) may present the data and/or analysis of the data to the collaborator(s) (608A, 608B). Further, the field performance module (601) may be configured to send notifications to, for example, the collaborator(s) (608A, 608B). The notifications may be based on criteria including but not limited to: a wellsite, an oilfield, production of an oilfield/wellsite, status of equipment associated with an oilfield/wellsite, alerts of certain conditions, or some other information related to oilfields/wellsites.

The field performance module (601) interacts with the workflow manager (602). The workflow manager (602) is configured to manage workflows associated with production operations. A workflow (or process) may include a plurality of steps for performing a production operation of an oilfield. For example, at least one of the workflow steps may correspond to functionality provided by the field performance module (601). In another example, at least one of the workflow steps may correspond to analysis provided by a component (606), where the component (606) is not associated with the field performance module (601) and the workflow manager (602).

As depicted in FIG. 6A, the field performance module (601) may use the workflow manager (602) to handle workflows. The workflows may be applied to data to obtain a well plan. The well plan may be used at the surface unit (534) to adjust the production operations at the wellsite (402).

Collaborator(s) (608A, 608B) may interact directly (or indirectly) with the workflow manager (602) to request that the workflow manager (602) retrieve, store, adjust, and/or specify workflows. Alternatively, collaborator(s) (608A, 608B) may interact with the workflow manager (602) through the field performance module (601) to request that the workflow manager (602) retrieve, store, adjust, and/or specify workflows.

Figure 6B:
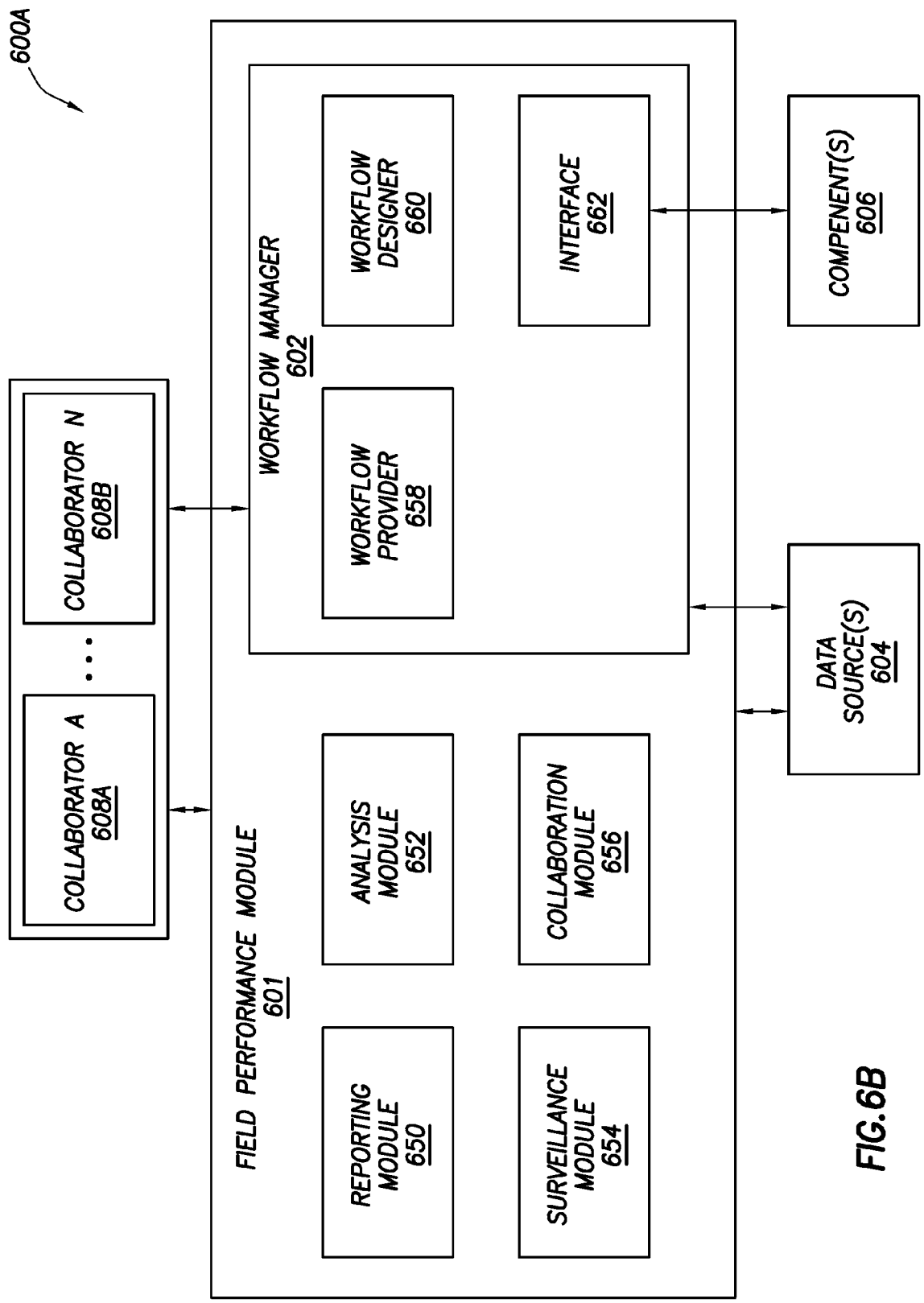

FIG. 6B is an alternate, schematic view of the production system (600A) for performing a production operation of an oilfield. As shown, the production system (600A) includes a field performance module (601) operatively connected to data source(s) (604). The field performance module (601) may further include a workflow manager (602). The workflow manager (602) may interact with the data source(s) (604). Optionally, the workflow manager (602) may interact with component(s) (606). Collaborators (608A, 608B) may interact with the field performance module (601), the workflow manager (602), and/or component(s) (606). The workflows used and/or generated by the workflow manager (602) may be manual and/or automatic workflows.

The field performance module (601) may include a reporting module (650), an analysis module (652), a surveillance module (654), and a collaboration module (656). These modules are designed to provide access to data associated with production operations.

The field performance module (601) may interact with a collaborator (e.g., 608A). Specifically, the reporting module (650) may present data associated with production operations to the collaborator (e.g., 608A). The data associated with the production operations may be stored in a data source (604) associated with the field performance module. Further, the collaborator (608A) may specify criteria to be used by the reporting module (650) to present data. For example, the collaborator (e.g., 608A) may specify criteria for the reporting module (650) including but not limited to: a wellsite, an oilfield, production of an oilfield/wellsite, ownership of a lease associated with an oilfield/wellsite, expiration date of a lease associated with an oilfield/wellsite, whether an oilfield/wellsite is active, or some other criteria related to oilfields/wellsites. Further, the reporting module (650) may selectively present data to the collaborator (e.g., 608A) based on an access rule. The access rule may be specified by another collaborator (e.g., 608B). Alternatively, the access rule may be specified by a workflow. The access rule specifies who may access a particular set of data. In addition, even if a collaborator may access the data, the access rule may specify that a given collaborator (e.g., 608A) is provided with only a subset of the data.

The analysis module (652) may allow for the analysis of the data associated with production operations. For example, the analysis module (652) may forecast production operations, perform injection pattern analysis, perform economic calculations to evaluate potential opportunities, obtain injection plans, recommend facility changes, or some other type of analysis related to production operations. The analysis module (652) may perform analysis to obtain output, which may be presented to collaborator(s) (608A, 608B) by the reporting module (650). The analysis module (652) may also be configured to allow a collaborator (e.g., 608A) to specify a custom analysis. For example, the collaborator (e.g., 608A) may specify a custom analysis for calculating the average production of wellsites in an oilfield. The custom analysis may be included in a workflow(s) specified by the workflow manager (602).

The surveillance module (654) may be configured to monitor data associated with production operations. Further, the surveillance module (654) may send notifications to the collaborator(s) (608A, 608B) when a criteria is satisfied. For example, the surveillance module may send a notification to collaborator (e.g., 608A) when the production of a wellsite falls below a certain level. The notification may be in the form of an email message, a short message service (SMS) message, or some other form of sending messages to a collaborator (e.g., 608A). The surveillance module (654) may also provide data associated with oilfield productions operations to the collaborator (e.g., 608A) in real-time.

The collaboration module (656) may be configured to allow collaboration between collaborators (608). Specifically, the collaboration module (656) may interact with the workflow designer (660) to allow collaborators (608A, 608B) to specify a workflow. For example, the collaboration module (656) may specify a plurality of steps, where each step is provided by one of the collaborators (e.g., 608A) such that the final workflow includes steps provided by multiple collaborators (608A, 608B). Further, the collaboration module (656) may also allow one collaborator (e.g., 608A) to consult with another collaborator (e.g., 608B) to share data associated with production operations and/or receive a recommendation from the other collaborator (e.g., 608B). A recommendation may be associated with a step included in a workflow.

The workflow manager (602) may include a workflow provider (658), a workflow designer (660), and an interface (662). These components are designed to manage workflows associated with production operations.

The workflow provider (658) may be configured to provide access to workflows. The field performance module (601) may interact with the workflow provider (658) to retrieve a workflow, which may then be applied to data associated with production operations. The workflow provider (658) may also be configured to filter stored workflows based on criteria received from the field performance module (601). In this case, the field performance module (601) may receive a plurality of workflows satisfying the criteria. The field performance module (601) may send criteria to the workflow provider based on input from a collaborator (608A, 608B) and/or the user of the field performance module (601).

The workflow designer (660) may be configured to specify a workflow including a plurality of steps configured to optimize a production operation of an oilfield. A collaborator (e.g., 608A) may specify at least one step using the workflow designer (660). Alternatively, the collaborator (e.g., 608A) may interact with the workflow designer (660) through the field performance module (601). The workflow designer (660) may store workflows in a data source (604) associated with the workflow designer (660). A stored workflow may be retrieved by the workflow provider (658). The workflow designer (660) may also be configured to modify a workflow. Specifically, the workflow designer (660) may receive a request to modify a step included in the workflow from a collaborator (e.g., 608A). Alternatively, the workflow designer (660) may receive a request to modify a step included in the workflow from the collaboration module (656), where the request is based on input from at least one collaborator (e.g., 608A).

The interface (662) may be configured to provide access to component(s) (606). The component(s) (606) may be configured to perform analysis on data associated with oilfield performance operations. The component(s) (606) may interact with the interface (662) using a common framework. More specifically, the interface (662) and a component (606) may both conform to the common framework, where the component (606) expects input of a standard input format and the interface (662) expects output of a standard output format. A component (606) may correspond to a module provided by a third-party. The analysis performed by the component may be provided to the workflow manager (602) via the interface (662). Alternatively, the interface (662) may provide information related to the component to the field performance module (601), which may then perform the analysis provided by the component.

FIG. 7 shows a flow chart depicting a production method (700) for performing production operations. The method may be performed using, for example, the system of FIGS. 6A and 6B. The method may involve specifying an automated workflow having a plurality of steps for generating a well plan configured to optimize performing the production operations (ST 702), obtaining data associated with the production operations (ST 704), automatically applying the automated workflow to the data to generate the well plan (ST 706), and adjusting the production operations based on the well plan (ST 708).

The automated workflow may be specified by a variety of methods (ST 702). More specifically, a plurality of steps included in the automated workflow may be specified based on input from collaborator(s). In this case, the plurality of steps may be specified based on the input of a number of collaborators, where each collaborator contributes to specify at least one of the plurality of steps. Optionally, specifying the plurality of steps may also involve a variety of collaborative procedures between the collaborators. Examples of collaborative procedures includes, but are not limited to, an approval procedure, a verification procedure, a refinement procedure, or some other collaboration between collaborators.

Those skilled in the art will appreciate that the automated workflow may also be specified by retrieving a previously stored automated workflow. In this case, the automated workflow may be retrieved based on criteria specified by a collaborator. The criteria may specify a variety of attributes associated with the production operations (e.g., geographic location, geologic formation information, budgetary considerations, identified problem, etc.).

Next, data associated with the production operations may be obtained from a variety of sources (ST 704). The data may be retrieved from data source(s) (604 of FIGS. 6A and 6B). Further, the data may be obtained by transforming other data.

In one or more embodiments of the invention, the data source(s) may be specified based on input from at least one of the collaborators. For example, a collaborator may specify that data should be obtained from particular sensors used in the production operations. In another example, a collaborator may specify that data should be obtained from a variety of data storage devices including intermediate data (i.e., processed raw data obtained from sensors) associated with the production operations.

The automated workflow may then be automatically applied to the data to generate the well plan (ST 706) by a variety of methods. A collaborator may request the automated workflow be applied to the data via a request sent to the field performance module (601 in FIG. 6A). Alternatively, the automated workflow may be applied to the data based on a specified schedule (e.g., hourly, weekly, in response to a specified event such as receiving new data, etc.). After the well plan is generated, the well plan may be presented to a collaborator at the reporting module (650 in FIG. 6B). In another example, the well plan may be presented at the surface unit (534 in FIG. 6A).

The production operations may then be adjusted based on the well plan (ST 708) by a variety of methods. A user may adjust the production operations based on the well plan using the controller (522 in FIG. 5) at the surface unit (534 in FIG. 5). In another example, the field performance module may re-apply the automated workflow to adjust the well plan in real-time. In this case, the production operations may be adjusted automatically based on the updated well plan in real-time (e.g., corrosion control based on bottomhole pressure, etc.).

Optionally, the automated workflow may be stored (ST 710). The automated workflow may be stored in a data source (604 of FIGS. 6A and 6B) associated with the field performance module (601 of FIGS. 6A and 6B). Further, information associated with the automated workflow may be stored. The information associated with the automated workflow may include but is not limited to: an oilfield production operations problem, the collaborator(s), a time the automated workflow was created, a rating of the utility of the workflow, and/or some other information associated with the automated workflow.

Optionally, at least one of the plurality of steps in the automated work flow may be modified based on input from at least one of the plurality of collaborators to generate an updated automated workflow (ST 712). In this case, an updated well plan may be generated based on the updated automated workflow. The updated well plan may then be used to adjust the production operations as discussed above in ST 708.

The steps of the method in FIG. 7 are depicted in a specific order. However, it will be appreciated that the steps may be performed simultaneously or in a different order or sequence.

Figure 8:
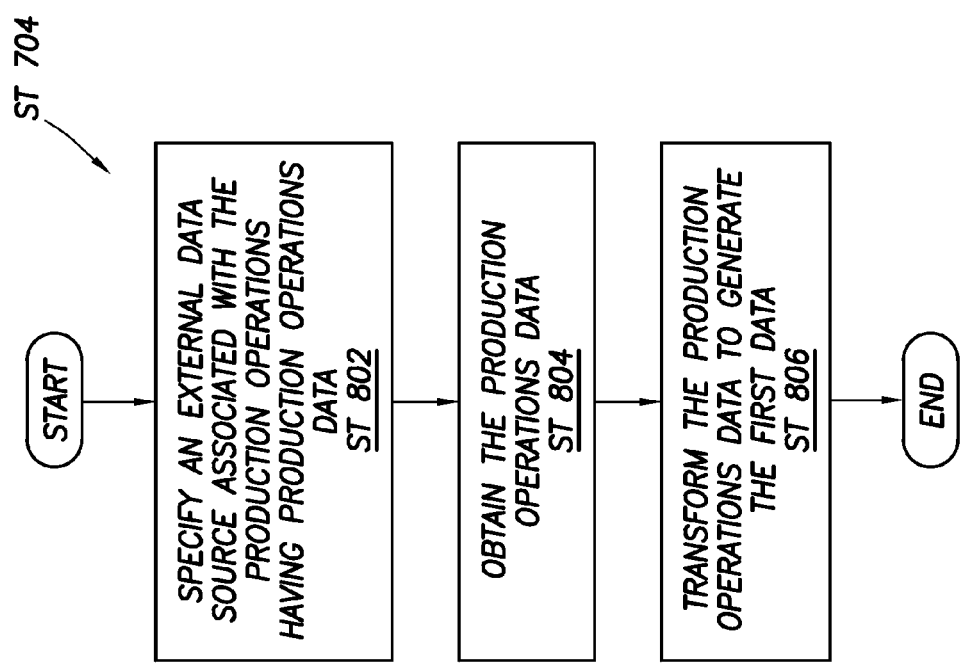

FIG. 8 shows a flow chart depicting a production data method (800) for obtaining data associated with production operations. The production data method (800) may be performed using, for example, the production system of FIGS. 6A and 6B. Further, the method may describe the obtaining data step as discussed above in ST 704 of FIG. 7.

The method may involve specifying an external data source associated with the production operations having production operations data (ST 802), obtaining the production operations data (ST 804), and transforming the production operations data to generate the data (ST 806).

The external data source associated with the production operations having production operations data may be specified (ST 802) by a variety of methods. A collaborator may specify the data source. For example, the collaborator may specify a data source having production operations data associated with the field performance module (601 of FIGS. 6A and 6B). In another example, the collaborator may specify an external data source having production operations data. More specifically, the collaborator may identify locations in the data source of required parameters for performing an automated workflow. Those skilled in the art will appreciate that any number of data sources may be specified as containing the data for the automated workflow.

Next, the production operations data may be obtained (ST 804) by a variety of methods. As discussed with respect to FIGS. 3 and 5, production operations data associated with production operations may be generated by sensors (S) at a wellsite or from other sources. The production operations data may be acquired at a surface unit, stored at a data source, and then retrieved. Alternatively, the production operations data may be received directly from a sensor.

The production operations data may then be transformed to obtain data (ST 806) by a variety of methods. For example, the production operations data may be filtered, the production operations data may be normalized, the production operations data may be time-shifted, the production operations data may be combined with other data, and/or the production operations data may be operated on (e.g., summed, ordered, sorted, or some other type of operation). The production operations data may then be used to perform one or more steps in the automated workflow.

The steps of the method in FIG. 8 are depicted in a specific order. However, it will be appreciated that the steps may be performed simultaneously or in a different order or sequence.

Figure 9:
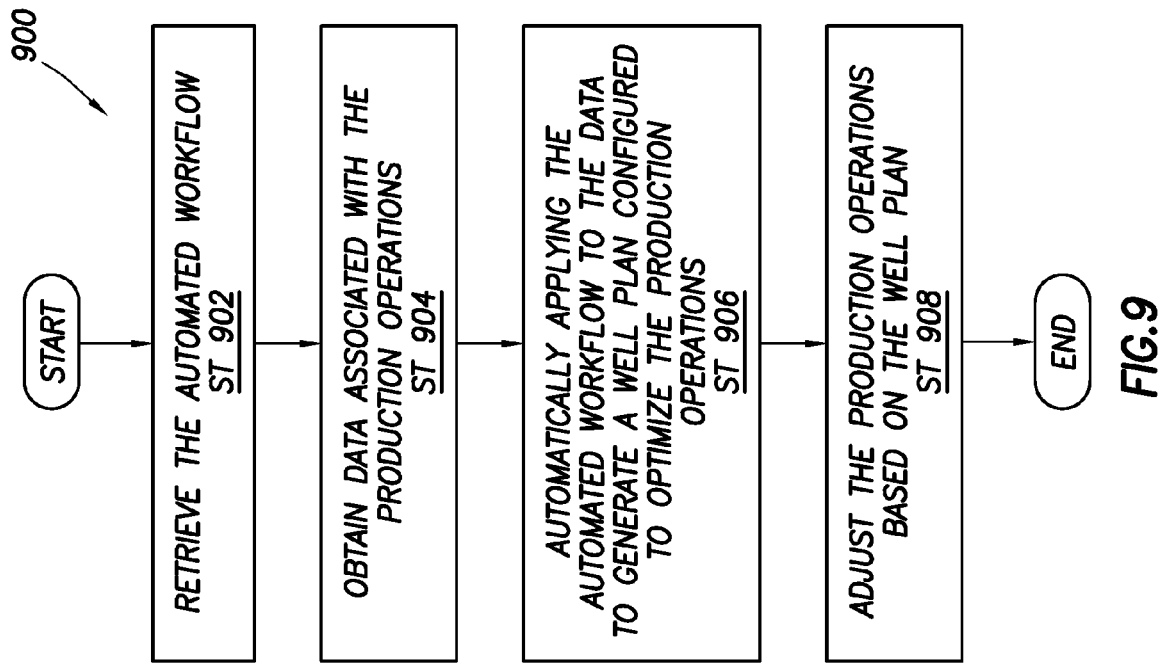

FIG. 9 shows a flow chart depicting a method (900) for using a stored automated workflow. The method may be performed using, for example, the system of FIGS. 6A and 6B. The method may involve retrieving the automated workflow (ST 902), obtaining data associated with the production operations (ST 904), automatically applying the automated workflow to the data to generate a well plan configured to optimize performing the production operations (ST 906), and adjusting the production operations based on the well plan (ST 908).

The automated workflow may be retrieved (ST 902) by a variety of methods. The automated workflow may be retrieved from a data source. Further, the automated workflow may be retrieved based on criteria specified by a collaborator. The collaborator may specify the criteria based on an oilfield production operations problem, where the criteria are used to retrieve a number of automated workflows associated with the oilfield production operations problem. In this case, the user may select an automated workflow from the list of relevant automated workflows.

Next, data associated with production operations may be obtained from a variety of sources (ST 904). The data may be retrieved from data source(s) (604 of FIGS. 6A and 6B) as discussed above with respect to FIG. 8.

The automated workflow may then be automatically applied to the data to generate the well plan (ST 906) by a variety of methods. A collaborator may request the automated workflow be applied to the data at the field performance module (601 of FIGS. 6A and 6B). Alternatively, the automated workflow may be applied to the data based on a schedule. After the well plan is generated, the well plan may be presented to a collaborator using the reporting module (650 of FIGS. 6A and 6B). In another example, the well plan may be presented at the surface unit (534 in FIG. 6A).

The production operations may then be adjusted based on the well plan (ST 908) by a variety of methods. A user may adjust the production operations based on the well plan using the controller (522 in FIG. 5) at the surface unit (534 in FIG. 5). In another example, the field performance module may re-apply the automated workflow to adjust the well plan in real-time. In this case, the production operations may be adjusted automatically based on the updated well plan in real-time.

ST 902-ST 908 may be repeated for other data. For example, the collaborator may wish to retrieve and reapply the automated workflow when there is a substantial change in production operations data associated with the production operations. In another example, ST 902-ST 908 may be repeated automatically based on a schedule (e.g., daily, weekly, monthly, etc.).

The steps of the method in FIG. 9 are depicted in a specific order. However, it will be appreciated that the steps may be performed simultaneously or in a different order or sequence.

Figure 10:
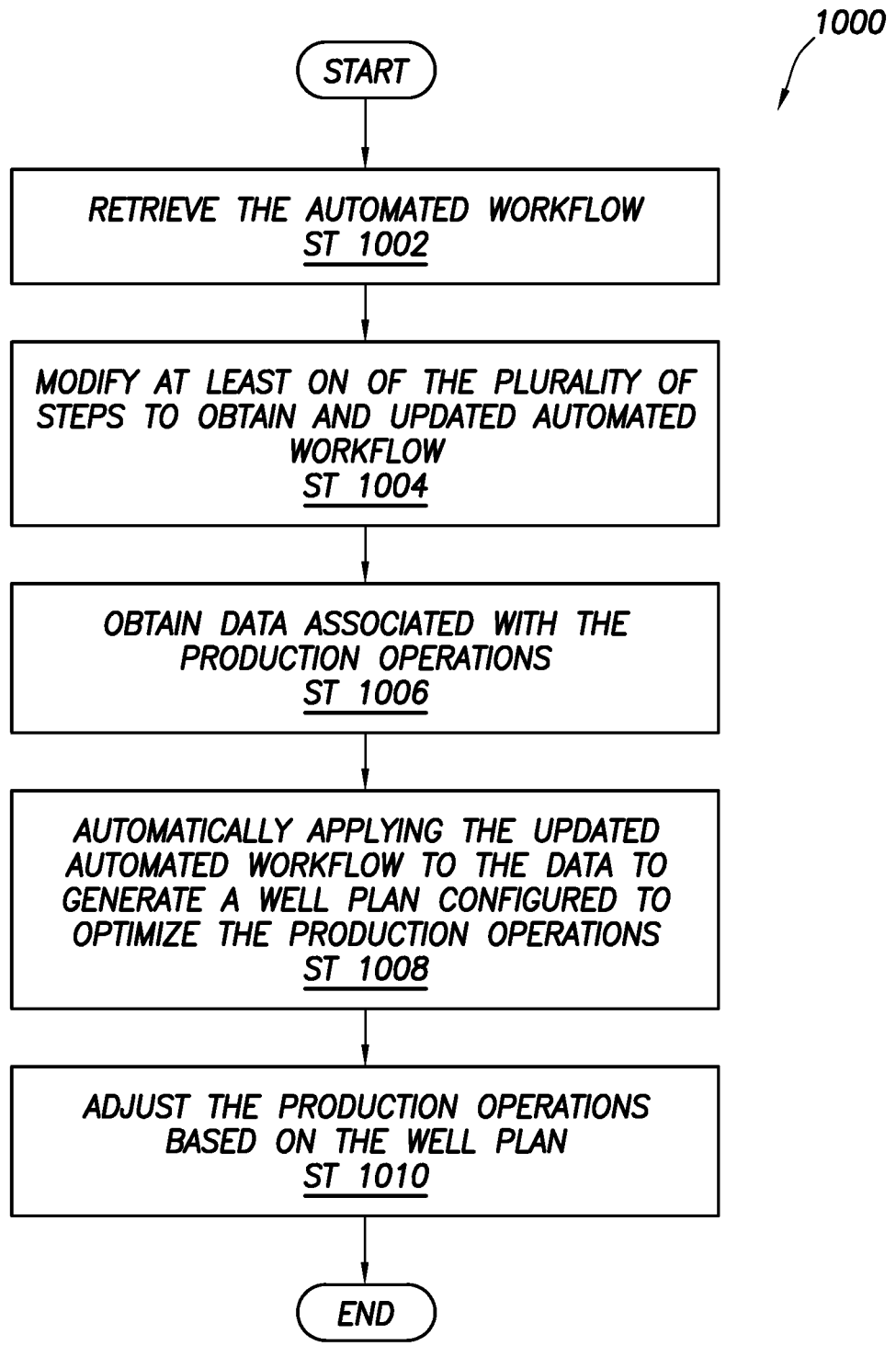

FIG. 10 shows a flow chart depicting a method (1000) for using a stored automated workflow. The method may be performed using, for example, the production system 600 of FIGS. 6A and 6B. The method may involve retrieving the automated workflow (ST 1002), modifying at least one of the plurality of steps to obtain an updated automated workflow (ST 1004), obtaining data associated with the production operations (ST 1006), automatically applying the updated automated workflow to the data to generate a well plan configured to optimize performing the production operations (ST 1008), and adjusting the production operations based on the well plan (ST 1010).

The automated workflow may be retrieved (ST 1002) by a variety of methods. The automated workflow may be retrieved from a data source. Further, the automated workflow may be retrieved based on criteria specified by a collaborator. The collaborator may specify the criteria based on an oilfield production operations problem, where the criteria are used to retrieve a number of automated workflows associated with the oilfield production operations problem. In this case, the user may select an automated workflow from the list of relevant automated workflows.

At least one of plurality of steps may then be modified to obtain an updated automated workflow (ST 1004) by a variety of methods. A collaborator may modify at least one of the plurality of steps using the workflow designer (660 of FIG. 6B). In another case, at least one of the plurality of steps may be modified automatically based on a schedule. For example, a step may be modified automatically based on real-time economic data such that a different analysis is performed depending on the real-time economic data.

Next, data associated with production operations may be obtained from a variety of sources (ST 1006). The data may be retrieved from data source(s) (604 of FIGS. 6A and 6B) as discussed above with respect to FIG. 8.

The updated automated workflow may then be automatically applied to the data to generate the well plan (ST 1008) by a variety of methods. A collaborator may request the updated automated workflow be applied to the data at the field performance module (601 of FIGS. 6A and 6B). Alternatively, the updated automated workflow may be applied to the data based on a schedule (e.g., daily, weekly, monthly, etc.). After the well plan is generated, the well plan may be presented to a collaborator using the reporting module (650 in FIG. 6B). Alternatively, the well plan may be presented at the surface unit (534 in FIG. 6A).

The production operations may then be adjusted based on the well plan (ST 1010) by a variety of methods. A user may adjust the production operations based on the well plan using the controller (522 in FIG. 5). In another example, the field performance module may re-apply the updated automated workflow to adjust the well plan in real-time. In this case, the production operations may be adjusted based on the updated well plan in real-time.

ST 1002-ST 1010 may be repeated for other data. For example, the collaborator may wish to retrieve, modifying, and apply a new updated automated workflow when there is a substantial change in production operations data associated with the production operations. Alternatively, 1002-ST 1010 may be repeated automatically based on a schedule (e.g., daily, weekly, monthly, etc.).

The steps of the method in FIG. 10 are depicted in a specific order. However, it will be appreciated that the steps may be performed simultaneously or in a different order or sequence.

FIG. 11 shows a flow chart depicting a method (1100) for performing production operations. The method may be performed using, for example, the system of FIGS. 6A and 6B. The method may involve specifying a data source associated with the production operations having production operations data (ST 1102), selectively presenting each of a plurality of subsets of the production operations data to at least one of a plurality of collaborators (ST 1104), receiving a plurality of steps each from at least one of the plurality of collaborators (ST 1106), specifying an automated workflow having the plurality of steps for generating an well plan configured to optimize performing the production operations (ST 1108), obtaining data associated with the production operations (ST 1110), automatically applying the automated workflow to the data to generate the well plan, (ST 1112), and adjusting the production operations based on the well plan (ST 1114).

The data source associated with the production operations having production operations data may be specified (ST 1102) by a variety of methods. Collaborator(s) may specify the data source. For example, the collaborator may specify a data source having production operations data associated with the field performance module (601 of FIGS. 6A and 6B). In another example, the collaborator may specify an external data source having production operations data. More specifically, the collaborator may identify locations in the data source of required parameters for performing an automated workflow. Those skilled in the art will appreciate that any number of data sources may be specified as containing the data for the automated workflow.

Optionally, each of a plurality of subsets of the production operations data may then be selectively presented to at least one collaborator (ST 1104). A subset of the production operations data may be presented to a collaborator using the reporting module (650 of FIG. 6B). In another example, a notification having the subset of production operations data may be sent to the collaborator. The subset of the production operations data may be presented based on criteria specified by the collaborator(s). Further, the subset of the production operations data may be restricted based on an access rule as discussed with respect to FIG. 6B.

The plurality of steps may then be received from at least one collaborator (ST 1106) by a variety of methods. More specifically, the plurality of steps included in the automated workflow may be specified based on input from collaborator(s). In this case, the plurality of steps may be specified based on the input of a number of collaborators, where each collaborator contributes to specify at least one of the plurality of steps. Optionally, specifying the plurality of steps may also involve a variety of collaborative procedures between the collaborators. Examples of collaborative procedures include, but are not limited to, an approval procedure, a verification procedure, a refinement procedure, or some other collaboration between collaborators.

The automated workflow having the plurality of steps for generating an well plan configured to optimize performing the production operations may then be specified (ST 1108). The collaborator(s) may specify the automated workflow at the workflow designer (660 of FIG. 6B). Further, the collaborator(s) may also provide information related to the automated workflow (e.g., an oilfield production operations problem, other collaborators to notify of the automated workflow, or some other information associated with the automated workflow).

Next, data associated with the production operations may be obtained from a variety of sources (ST 1110). The data may be retrieved from data source(s) (604 of FIGS. 6A and 6B) as discussed above with respect to FIG. 8.

The automated workflow may then be automatically applied to the data to generate the well plan (ST 1112) by a variety of methods. Collaborator(s) may request the automated workflow be applied to the data via a request sent to the field performance module (601 of FIGS. 6A and 6B). Alternatively, the automated workflow may be applied to the data based on a specified schedule (e.g., hourly, weekly, in response to a specified event such as receiving new data, etc.). After the well plan is generated, the well plan may be presented to collaborator(s) at the reporting module (660 in FIG. 6B). In another example (or additionally), the well plan may be presented at the surface unit (534 in FIG. 6A).

The production operations may then be adjusted based on the well plan (ST 1114) by a variety of methods. A user may adjust the production operations based on the well plan using the controller (522 in FIG. 5) at the surface unit (534 in FIG. 5). Alternatively, the field performance module may re-apply the automated workflow to adjust the well plan in real-time. In this case, the production operations may be adjusted based on the updated well plan in real-time.

The steps of the method in FIG. 11 are depicted in a specific order. However, it will be appreciated that the steps may be performed simultaneously or in a different order or sequence.

It will be understood from the foregoing description that various modifications and changes may be made in the preferred and alternative embodiments of the present invention without departing from its true spirit. For example, the method may be performed in a different sequence, and the components provided may be integrated or separate.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A method of performing production operations of an oilfield having at least one process facility and at least one wellsite operatively connected thereto, each at least one wellsite having a wellbore penetrating a subterranean formation for extracting fluid from an underground reservoir therein, the method comprising:
   receiving, using a processor of a computer system, a plurality of steps from a plurality of collaborators, wherein at least one of the plurality of steps corresponds to analysis performed by an external component configured to provide standardized output using a common framework;
   specifying, using the processor, an automated workflow comprising the plurality of steps from the plurality of collaborators and for generating a first well plan;
   storing the automated workflow and an oilfield production operations problem associated with the automated workflow;
   receiving, after storing the automated workflow, a set of criteria based on the oilfield production operations problem and specified by at least one of the plurality of collaborators;
   retrieving the automated workflow based on the set of criteria specified by at least one of the plurality of collaborators, wherein the automated workflow is one of a plurality of stored automated workflows;
   specifying an external data source associated with the production operations, wherein the external data source is specified based on input from at least one of the plurality of collaborators;
   obtaining, using the processor, first data associated with the production operations from the external data source;
   applying, using the processor, the automated workflow to the first data to generate the first well plan;
   adjusting, using the processor, the production operations based on the first well plan;
   modifying, using the processor, a first step of the plurality of steps based on input from at least one of the plurality of collaborators to generate an updated first step;
   modifying, using the processor, a second step of the plurality of steps based on real-time economic data to generate an updated second step, the updated second step for performing an analysis that is dependent on the real-time economic data;
   generating an updated automated workflow based on the updated first step and the updated second step;
   applying, in response to second data comprising a change to the first data associated with the production operations, the updated automated workflow to the second data to generate a second well plan; and
   adjusting the production operations based on the second well plan.

2. The method of claim 1, further comprising:
   presenting the first well plan.

3. The method of claim 1, further comprising:
monitoring the production operations to obtain production operations data; and
adjusting the automated workflow based on the production operations data.

4. The method of claim 1, further comprising:
selectively presenting each of a plurality of subsets of the first data to at least one of the plurality of collaborators.

5. The method of claim 1, wherein the first data is based on one selected from a group consisting of actual data, historical data, and forecasted data.

6. A system for performing production operations of an oilfield having at least one process facility and at least one wellsite operatively connected thereto, each at least one wellsite having a wellbore penetrating a subterranean formation for extracting fluid from an underground reservoir therein, comprising:
a memory configured to store a first well plan and first data associated with the production operations;
a processor configured to execute:
a workflow manager, located within a field performance module, configured to:
receive a plurality of steps from a plurality of collaborators, wherein at least one of the plurality of steps corresponds to analysis performed by an external component configured to provide standardized output using a common framework;
specify an automated workflow comprising the plurality of steps from the plurality of collaborators and for generating the first well plan;
store the automated workflow and an oilfield production operations problem associated with the automated workflow;
receive, after storing the automated workflow, a set of criteria based on the oilfield production operations problem and specified by at least one of the plurality of collaborators;
retrieve the automated workflow based on the set of criteria specified by at least one of the plurality of collaborators, wherein the automated workflow is one of a plurality of stored automated workflows; and
specify an external data source associated with the production operations, wherein the external data source is specified based on input from at least one of the plurality of collaborators,
the field performance module configured to:
obtain the first data associated with the production operations from the external data source;
apply the automated workflow to the first data to generate the first well plan;
modify a step of the plurality of steps based on real-time economic data to generate an updated step, the updated step for performing an analysis that is dependent on the real-time economic data;
generate an updated automated workflow based on the updated step; and
apply, in response to second data comprising a change to the first data associated with the production operations, the updated automated workflow to the second data to generate a second well plan, and
a surface unit configured to:
update the production operations based on the first well plan; and
adjust the production operations based on the second well plan.

7. The system of claim 6, wherein the field performance module is further configured to present the first well plan.

8. The system of claim 6, wherein the workflow manager is further configured to:
modify at least one of the plurality of steps based on input from at least one of the plurality of collaborators to generate the updated automated workflow.

9. The system of claim 6, further comprising:
a surveillance module configured to monitor the production operations to obtain production operations data, wherein the workflow manager is further configured to adjust the automated workflow based on the production operations data.

10. The system of claim 6, wherein the field performance module is further configured to selectively present each of a plurality of subsets of the first data to at least one of the plurality of collaborators.

11. The system of claim 6, wherein the first data is based on one selected from a group consisting of actual data, historical data, and forecasted data.

12. A non-transitory computer readable medium, embodying instructions executable by the computer to perform method steps for performing production operations of an oilfield having at least one process facility and at least one wellsite operatively connected thereto, each at least one wellsite having a wellbore penetrating a subterranean formation for extracting fluid from an underground reservoir therein, the instructions comprising functionality to:
receive a plurality of steps from a plurality of collaborators, wherein at least one of the plurality of steps corresponds to analysis performed by an external component configured to provide standardized output using a common framework;
specify an automated workflow comprising the plurality of steps from the plurality of collaborators and for generating a first well plan;
storing the automated workflow and an oilfield production operations problem associated with the automated workflow;
receiving, after storing the automated workflow, a set of criteria based on the oilfield production operations problem and specified by at least one of the plurality of collaborators;
retrieving the automated workflow based on the set of criteria specified by at least one of the plurality of collaborators, wherein the automated workflow is one of a plurality of stored automated workflows;
specify an external data source associated with the production operations, wherein the external data source is specified based on input from at least one of the plurality of collaborators;
obtain first data associated with the production operations;
apply the automated workflow to the first data to generate the first well plan, wherein the production operations are adjusted based on the first well plan;
modify a step of the plurality of steps based on real-time economic data to generate an updated step, the updated step for performing an analysis that is dependent on the real-time economic data;
generate an updated automated workflow based on the updated step;
apply, in response to second data comprising a change to the first data associated with the production operations, the updated automated workflow to the second data to generate a second well plan; and
adjust the production operations based on the second well plan.

13. The non-transitory computer readable medium of claim 12, the instructions further comprising functionality to:
   modify at least one of the plurality of steps based on input from at least one of the plurality of collaborators to generate the updated automated workflow.

* * * * *